UNITED STATES PATENT OFFICE 2,157,508

PROCESS FOR THE RECOVERY OF IODIDES, AS IODINE FROM WATER

Oliver M. Urbain and William R. Stemen, Columbus, Ohio, assignors to Charles H. Lewis, Harpster, Ohio No Drawing. Application November 27, 1935, Serial No. 51,967. Renewed October 25, 1938

3 Claims. (Cl. 23—217)

It is the purpose of the present invention to provide an economical and practical process for the recovery of iodides as iodine from water.

Sea water, and many brines originating in deep wells, as well as highly mineralized inland bodies of water, contain iodides in appreciable quantities. Heretofore the cost of recovering such iodides has been prohibitive. By the practice of the process of the present invention the recovery of iodides from such waters is rendered entirely feasible and practical.

It is an object of the invention to provide a suitable exchange or adsorbent material for effecting the removal of the iodides from an iodide bearing solution.

We have found that it is possible to prepare an exchange or adsorbent material that can be advantageously used to effect such a removal of iodides. In this case we have used two types of formulae. We have for the purpose of illustration used the

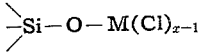

formula to show the active grouping in our compounds and it should be noted that the three free valences of the Si have not been satisfied. We use the formula of the type

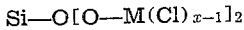

to show how the active grouping given above fits into a specific complete compound in which all free valences are satisfied, the latter compound being such a compound. This compound is a type of metasilicate. The only difference in these structures lies in the satisfaction of the free valences. To facilitate a clear appreciation and understanding of the invention we will first detail the method of preparing and the characteristics possessed by the exchange or adsorbent material which is employed in the practice of our novel process for recovering iodides from water.

The materials prepared for effecting the exchange or adsorption of the iodides are made up of the metal chloride silicates. They conform to the general formulae:

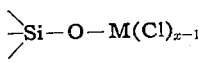

in which M designates a metal having a valence of two or more and $x$ designates the valence of the metal. The materials for effecting the iodide exchange must have a solubility in water of less than 0.3 gram per liter. The general formulae show only the active part of the molecule, the three free valences to the left of the Si merely indicate the manner of attachment of the inactive part of the molecule.

In the preparation of these materials the general reaction for their preparation may be expressed as follows:

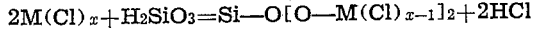

Specific examples of reactions occurring in the preparation of the exchange materials are as follows:

Example No. 1

Example No. 2

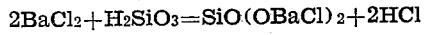

In the first example we employ anhydrous ferric chloride and silicic acid, and in the second example, we employ barium chloride and silicic acid. The exchange materials can be prepared in either of two ways:

First, by fusing the appropriate metal chloride with silicic acid under definitely controlled conditions, and, second by treating a solution of sodium silicate with the appropriate metal chloride in solution. If the latter procedure is followed it is necessary to substantially oxidize the metal of the material to a state of higher valence and, thereby, introduce one or more chlorine atoms into the molecule. When the exchange materials are used for the removal of iodide ions from water the chlorine in these compounds is replaced by the anion removed in accordance with the general formulae:

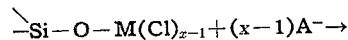
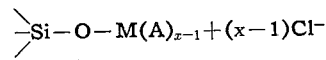

wherein M indicates a metal, $x$ indicates the valence of the metal and $A^-$ indicates a negative iodide ion.

In the employment of these materials there possibly occurs some superficial adsorption of the iodide ions but for the most part we find that the iodides are removed from the water by an exchange mechanism whereby the iodide ions are exchanged for chloride ions which are loosely held by the exchange material through chemical or physical processes or both. This procedure may be compared to cation exchange as effected through the medium of zeolites, except in the removal of iodides there is effected an exchange of anions.

In the preparation of these exchange materials, we have in general, made the materials by fusing a mixture of a halide with silicic acid or its anhydride.

The metal of the metal halide must have a valence of two or more. In some cases the presence of an added mono-valent metal in the above reaction mixture is found desirable. When such a mono-valent metal halide is employed, its halide must be the same as the halide of the metal having a valence of two or more. We have also found that in some cases the product is improved by heating in an atmosphere of a halogen.

For purposes of illustration we now describe the preparation of two materials suitable for effecting iodide exchange. It is to be understood that these examples are illustrative and not to be construed as a limitation of the invention.

First, five (5) parts of silicic acid and twenty-five (25) parts of hydrated barium chloride are intimately mixed and ground together. The mixture is fused at a temperature between 500° C. and 1500° C. for a period of from one to four hours. After cooling, the mass is washed free of soluble salts and is then ready for use.

Second, four (4) parts of silicic acid and eight (8) parts of anhydrous ferric chloride and eight (8) parts of sodium chloride are ground together and fused at a temperature between 500° C. and 1500° C. for one-half hour to three hours. The fused mass is then heated in an atmosphere of chlorine at approximately 1200° C. for one hour. The mass, after cooling, is water washed and is then ready for use.

It will be observed that we have indicated that the iodide exchange materials contain metasilicates. It is, of course, probable that these materials contain, as well, some chloride orthosilicates and chloride polysilicates, or a mixture of these compounds. In the preparation of the exchange materials all of the reagents employed must be in excess over the silicic acid.

Still a further illustration of the preparation of an exchange material is as follows:

Five (5) parts of silicic acid was fused with twenty-five (25) parts of crystallized $BaCl_2$ at 900° C. for two hours. The mass was then cooled and washed to free the same of soluble chlorides.

In carrying out the improved process for the recovery of iodides as iodine from water we pass the iodide bearing solution through a filter charged with an exchange material prepared in accordance with the foregoing description and having the general formulae:

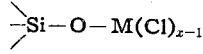

We have found that substantially a fifteen minute time period of contact of the iodide bearing solution with the filter medium to be adequate. After the exchange material has taken up its capacity of iodides from the solution the exchange material is removed from the filter and dried. We then treat the filter material with strong sulphuric acid in a retort and liberate the iodine which is sublimed by the application of heat. The sublimed iodine is recovered in a cooled chamber. The cooling chamber may advantageously be at a temperature not substantially below average room temperature, that is, around 60° to 70° F.

Reference is made to our copending application 51,966, filed Nov. 27, 1935, which has similar subject-matter.

Having thus described our invention what we claim is:

1. A step in the process for the recovery of iodides as iodine from water comprising subjecting an iodide bearing solution to the action of an exchange material having a solubility in water of less than 0.3 gram per liter prepared in accordance with the following reaction by effecting fusion of the reactants:

$$2FeCl_3 + H_2SiO_3 = SiO(OFeCl_2)_2 + 2HCl$$

2. A step in the process for the recovery of iodides as iodine from water comprising subjecting an iodide bearing solution to the action of an exchange material having a solubility in water of less than 0.3 gram per liter prepared in accordance with the following reaction by effecting fusion of the reactants:

$$2BaCl_2 + H_2SiO_3 = SiO(OBaCl)_2 + 2HCl$$

3. A step in the process for recovering iodides as iodine from water comprising subjecting the iodide bearing solution to the action of an exchange material having a solubility in water of less than 0.3 gram per liter and prepared by effecting fusion of the reactants of the following equation:

$$2M(Cl)_x + H_2SiO_3 \rightarrow SiO[O-M(Cl_{x-1})]_2 + 2HCl$$

wherein $M(Cl)_x$ represents a metal chloride selected from the group consisting of ferric chloride and barium chloride.

OLIVER M. URBAIN.
WILLIAM R. STEMEN.